United States Patent [19]

Raymer, II et al.

[11] Patent Number: 4,461,537

[45] Date of Patent: Jul. 24, 1984

[54] FIBER OPTIC CONNECTOR ASSEMBLY

[75] Inventors: Jack D. Raymer, II, St. Charles; Stephen A. Sampson, Wheaton; Burke J. Crane, Lombard, all of Ill.

[73] Assignee: Molex Incorporated, Isle, Ill.

[21] Appl. No.: 334,136

[22] Filed: Dec. 24, 1981

[51] Int. Cl.³ .............................................. G02B 7/26
[52] U.S. Cl. .................................. 350/96.20; 350/96.21
[58] Field of Search ............... 350/96.20, 96.21, 96.22; 250/227

[56] References Cited

U.S. PATENT DOCUMENTS

| | | | |
|---|---|---|---|
| 4,026,633 | 5/1977 | Crick | 350/96.21 |
| 4,140,365 | 2/1979 | Bürger et al. | 350/96.20 |
| 4,186,995 | 2/1980 | Schumacher | 350/96.20 |
| 4,240,695 | 12/1980 | Evans | 350/96.20 |
| 4,273,413 | 6/1981 | Bendiksen et al. | 250/227 |
| 4,325,607 | 4/1982 | Carlsen | 350/96.21 |
| 4,326,771 | 4/1982 | Henry et al. | 350/96.17 |
| 4,377,322 | 3/1983 | Ransley et al. | 350/96.20 |

FOREIGN PATENT DOCUMENTS

| | | | |
|---|---|---|---|
| 2618095 | 11/1977 | Fed. Rep. of Germany | 350/96.20 |
| 2036997 | 7/1980 | United Kingdom | 350/96.20 |

Primary Examiner—John D. Lee
Assistant Examiner—Frank González
Attorney, Agent, or Firm—Louis A. Hecht

[57] ABSTRACT

A connector assembly for mating an optoelectronic device mounted on the printed circuit board with the end of an optic fiber. The optoelectronic device has a housing including an optical port surrounding optical lens. The optical port has means for guiding a fiber end in alignment with the lens. A cylindrical ferrule having a flange at one end is secured around the fiber. A unitary connector housing is provided for receiving and maintaining the fiber end and the optical lens in mating relation. The connector housing includes a portion for receiving the optoelectronic device and means defining the elongated passageway for receiving the fiber and ferrule. The passageway communicates with the optical port. Also disclosed is a connector assembly for mating the end of one optical fiber to the end of another optical fiber. A cylindrical ferrule having a flange at one end is secured around each fiber. A housing is used for receiving and maintaining the fiber ends in mating relation. The housing includes two elongated passageways each for receiving its respective fiber and ferrule communicating through a mating port. Expandable engageable means are formed on each open end for removable cooperation with the respective ferrule flange for positioning the fiber ends against each other at the mating port. Means are formed adjacent both sides of the mating port for guiding each fiber end in alignment with the other fiber end.

10 Claims, 10 Drawing Figures 4,461,537

FIBER OPTIC CONNECTOR ASSEMBLY

BACKGROUND OF THE INVENTION

1. Field of the Invention

The present invention relates to connector assemblies for mating an optoelectronic device with the end of an optic fiber and mating a pair of fiber optic ends with one another.

2. Brief Description of the Prior Art

Most fiber optic connector assemblies are either difficult to manufacture, difficult to assemble and/or expensive to make and use. While it may be necessary to have a great degree of accuracy in the alignment of different optic elements with one another when dealing in telecommunication or digital applications, it is not always necessary to have the same degree of accuracy where the application does not demand it. Such applications are usually found in the consumer electronic markets which would use fiber optics for communication between two relatively short distances. One example of such application may be in the automotive industry.

SUMMARY OF THE INVENTION

It is, therefore, the principal object of the present invention to provide a simple, easy to make and assemble, low cost fiber optic connector assembly to mate one end of an optic fiber with either an optoelectronic device or the end of another optic fiber.

The object of the present invention are accomplished by providing connector assembly for mating the optical lens of an optoelectronic device with the end of an optic fiber comprising:

- an optoelectronic housing for receiving said optoelectronic device, said optoelectronic housing including an optical port surrounding the lens;
- a cylindrical ferrule having a flange at one end adapted to be secured around the fiber, said flange being located a predetermined distance from the end of the fiber;
- a unitary housing for receiving and maintaining the fiber end and lens in mating relation, said housing including
  - a portion for receiving the optoelectronic device, and
  - means defining an elongated passageway for receiving the fiber and ferrule, said passageway communicating with said optoelectronic receiving portion in alignment with said optical port and an open end through which the fiber and ferrule are received, said open end including expandable engageable means for removeable cooperation with said ferrule flange for positioning said fiber end against the optical port; and
  - means cooperating between said optical port and said fiber end for guiding said fiber end in alignment with said optical lens.

The objects of the present invention are also met by providing a connector assembly for mating the end of one optic fiber to another optic fiber comprising:

- a cylindrical ferrule having a flange at one end adapted to be secured around each fiber, said flange being located a predetermined distance from the end of each fiber;
- a housing for receiving and maintaining the fibers end in mating relation, said housing including
  - means defining two elongated passageways, each for receiving its respective fiber and ferrule,
  - a pair of open ends opposite each other through which each fiber and ferrule are received,
  - a mating port through which communication is allowed between said passageways,
  - expandable engageable means formed on each open end for removeable cooperation with the respective ferrule flange for positioning the fiber ends against each other at the mating port, and
  - means formed adjacent both sides of the mating port for guiding each fiber end in alignment with the other fiber end.

DESCRIPTION OF THE PREFERRED EMBODIMENT

Figure 1:
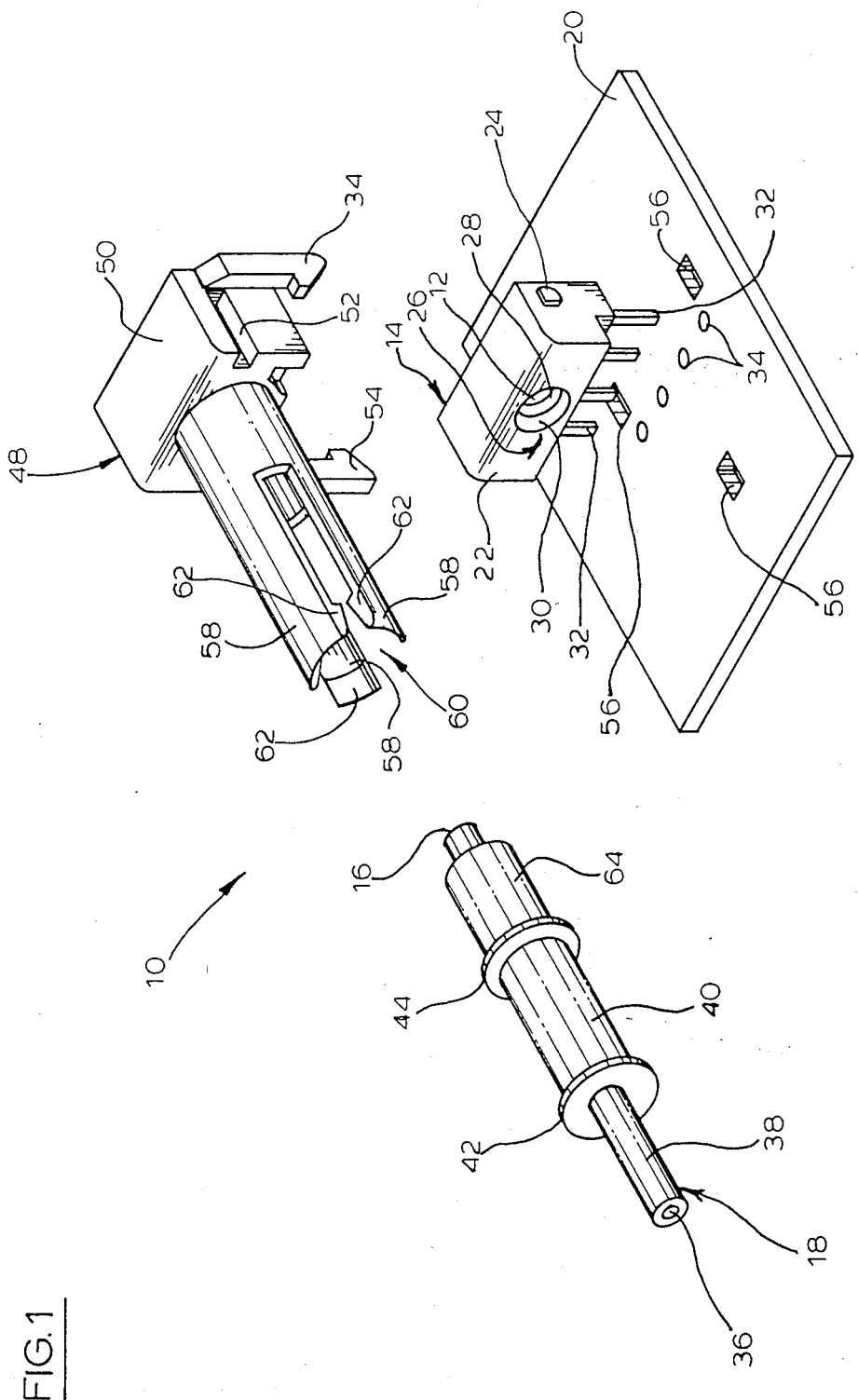
FIG. 1 is an exploded perspective view of one embodiment of a connector assembly of the present invention which mates the end of an optic fiber with an optoelectronic device.
Figure 2:
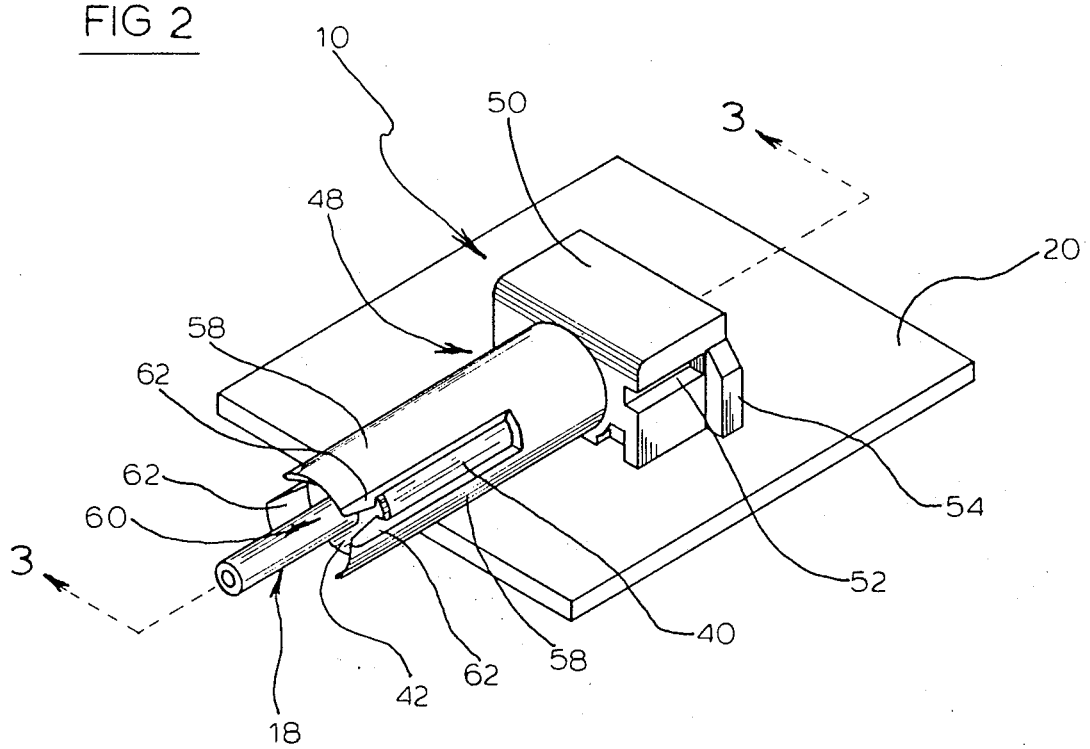
FIG. 2 is a perspective view of the connector assembly of FIG. 1 in an assembled condition.
Figure 3:
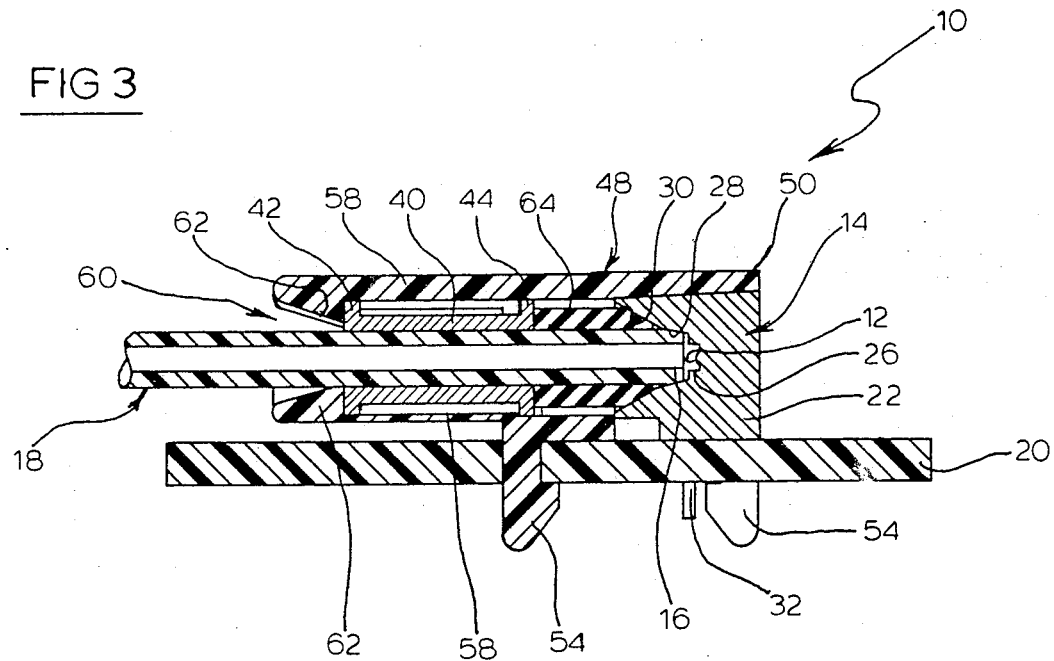
FIG. 3 is a sectional view taken generally along the line 3—3 of FIG. 2.

Turning now to the figures, FIGS. 1-3 shows one embodiment of a connector assembly, generally designated 10, which is designed for mating the optical lens 12 of an optoelectronic device, generally designated 14, with the end 16 of an optic fiber, generally designated 18. The optoelectronic device 14 is adapted to be mounted on a printed circuit board, generally designated 20, in a manner which will be discussed in greater detail hereinafter.

Looking at the FIG. 1, the optoelectronic device 14 is seen to include a housing 22 having protrusions 24 formed on either side thereof. An optical port 26 surrounds the lens 12 and provides communication therewith. Guiding and alignment means in the form of two funnel shaped portions 28 and 30 initially engage the fiber end 16 so that it will be accurately positioned with respect to the optical lens 12. The bottom of the optoelectronic device 14 is provided with a plurality of printed circuit board leads 32 which are receivable in corresponding holes 34 formed in the printed circuit board 20. After insertion into the holes 34, the leads 32 are soldered to the board.

The optic fiber 18 has a core 36 made of suitable light transmissive material such as a glass or clear plastic. The core 36 is encased in a cable jacket 38 made of material that is well known in the art.

An open ended cylindrical ferrule 40 is provided and is adapted to be crimped around the optic fiber 18. The ferrule 40 has two annular flanges 42 and 44 formed at either end thereof. When the ferrule is crimped on the fiber 18, the flanges 42 and 44 are located a predetermined distance from the end 16 of the optic fiber 18.

The connector assembly 10 has a unitary connector housing, generally designated 48, for receiving the optoelectronic device 14 and optic fiber 18 therein. The housing 48 is made of plastic or other suitable material. The connector housing 48 has a portion or cavity 50 for receiving the optoelectronic device 14 therein. The portion 50 has slots 52 on either side thereof for receiving protrusions 24 therein. This serves to position the optoelectronic device 14 within the connector housing 48 so that lens 12 assumes the proper location.

A plurality of depending mounting legs 54 are formed on the connector housing 48. The legs 54 are adapted to be received in corresponding holes 56 formed in the printed circuit board 20. Legs 54 are adapted to interengage with the holes 56 so that the connector housing 48 is securely fastened to the board 20.

An elongated passageway is defined by three cantilevered flexible fingers 58 extending from the portion 50 of the connector housing 48 which receives the optoelectronic device 14. This passageway has an open end 60 through which the end 16 of the optic fiber 18 is received and moved toward the other end thereof.

Shoulders 62 are formed on the free ends of fingers 58 adjacent the open end 60 of the passageway. The shoulders 62 are adapted to engage the annular flange 42 of ferrule 40. In this manner, not only is the end 16 of the optic fiber 18 positioned adjacent the optical lens 12, but, accidental withdrawal of the optic fiber 18 from the passageway is prevented.

In the event that the interface between the end 16 of the optic fiber 18 and the lens 12 is to be environmentally sealed, open ended cylindrical elastomer insert 64 is provided to be received on the end 16 of the fiber so that it abuts against the second annular flange 44 of the ferrule 40. As is best shown in FIG. 3, the free end of the insert 64 is pressed against contour or profile 28 adjacent the optical port 26. This forms an annular seal around the optical port 26.

Figure 4:
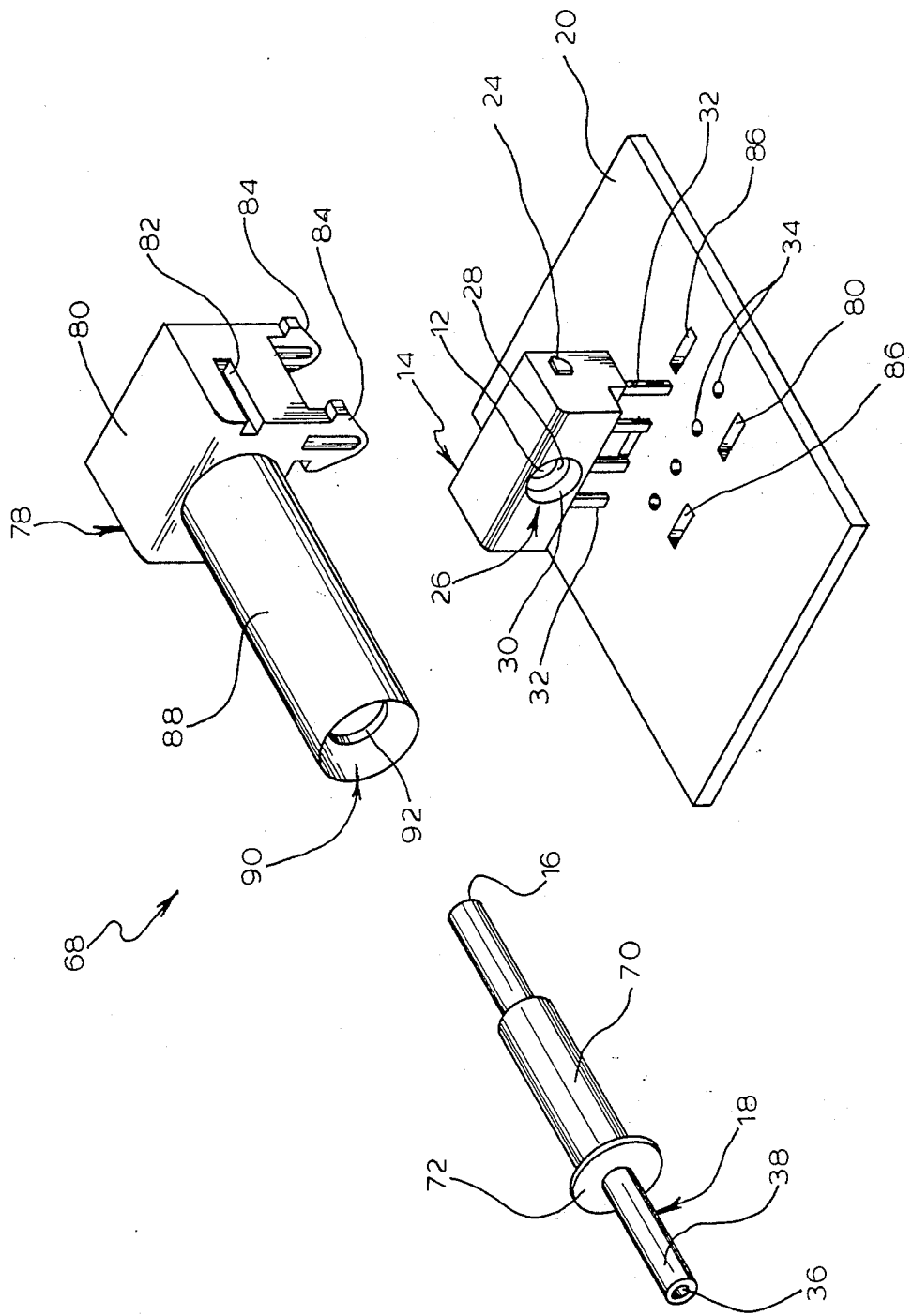
FIG. 4 is an exploded perspective view of another embodiment of a connector assembly of the present invention which mates an optic fiber end with an optoelectronic device.
Figure 5:
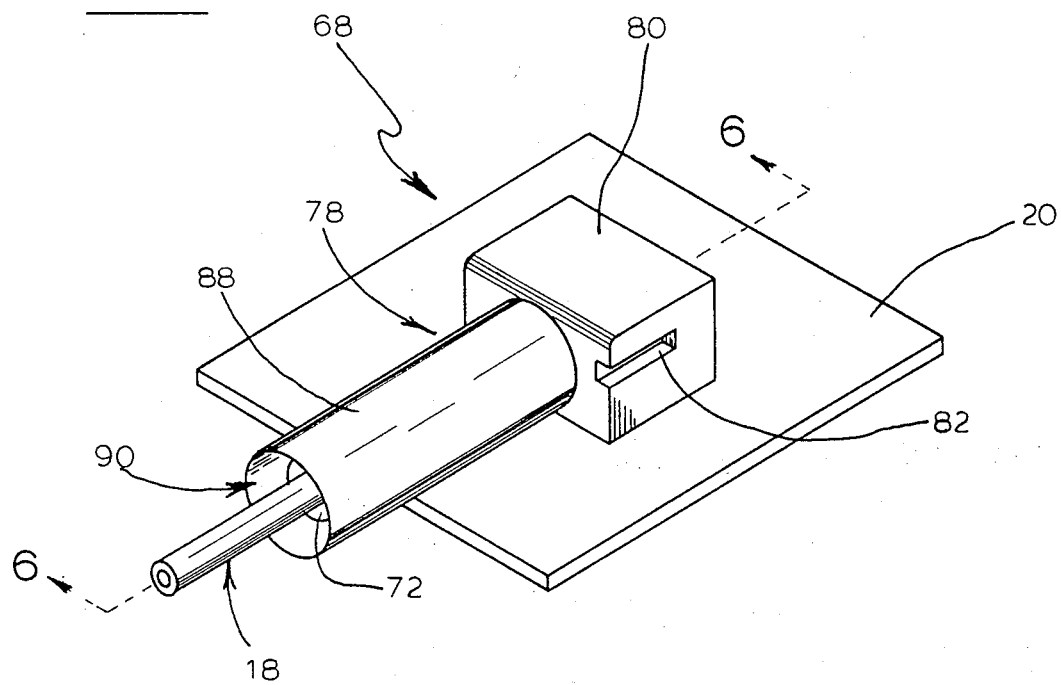
FIG. 5 is a perspective view of the connector assembly of FIG. 4 in an assembled condition.
Figure 6:
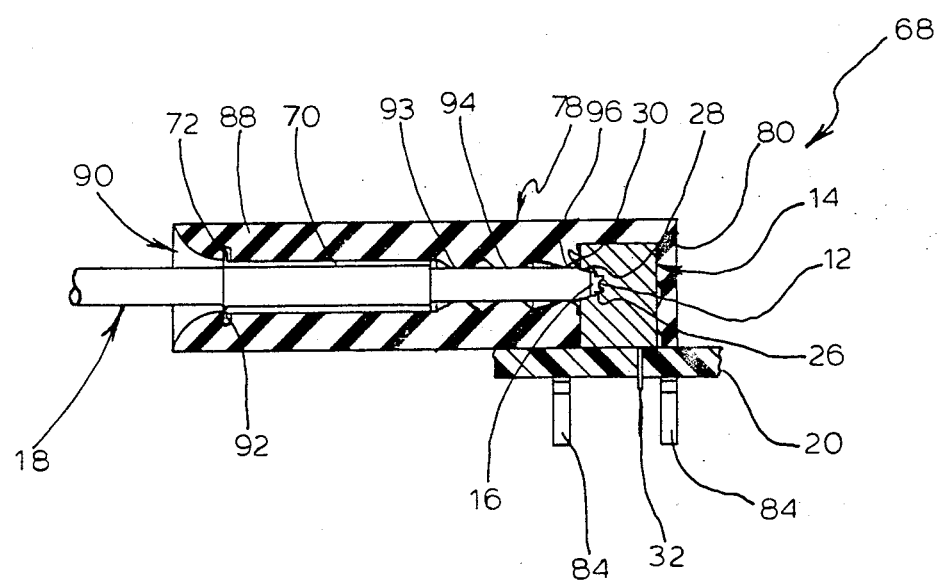
FIG. 6 is a sectional view taken generally along the line 6—6 of FIG. 5.

FIGS. 4–6 shows another embodiment of a connector assembly, generally designated 68, which is designed for mating the optical lens 12 of an optoelectronic device, generally designated 14, with the end 16 of an optic fiber, generally designated 18. The optoelectronic device 14 and the optic fiber 18 are identical with that which has already been described with respect to FIGS. 1–3 and the same reference numerals are used in FIGS. 4–6.

An open ended cylindrical ferrule 70 is provided and is adapted to be crimped around the optic fiber 18. The ferrule 70 has an annular flange 72 formed at one end thereof. When the ferrule 70 is crimped on to the fiber, the flange 72 is located a predetermined distance from the end 16 of the optic fiber 18.

The connector assembly 68 has a unitary connector housing, generally designated 78, for receiving the optoelectronic device 14 and optic fiber 18 therein. The connector assembly 68 is made of a resilient elastomeric material. The connector housing 78 has a portion or cavity 80 for receiving the optoelectronic device 14 therein. The portion 80 has slots 82 on either side thereof for receiving protrusions 24 therein. This serves to position the optoelectronic device 14 within the connector housing 78 so that lens 12 assumes the proper location.

A plurality of depending mounting legs 84 are formed on the connector housing 78. The legs 84 are adapted to be received in corresponding holes 86 formed in the printed circuit board 20. Legs 84 are adapted to interengage with the holes 86 so that the connector housing 78 is securely fastened to the board 20.

An elongated passageway is defined by the interior of a generally cylindrical portion 88 which extends from the portion 80 of the connector housing 78 which receives the optoelectronic device 14. This passageway has a flared open end 90 through which the end 16 of the optic fiber 18 is received and moved toward the other end thereof.

An annular slot 92 is formed adjacent the open end 90 and is adapted to receive the edge of the annular flange 72 of ferrule 70. In this manner, not only is the end 16 of the optic fiber 18 adjacent the optical lens 12, but, accidental withdrawal of the optic fiber 18 from the passageway is prevented.

It is desired that this connector assembly 68 be environmentally sealed. To that end, there is provided three restricted openings 93, 94 and 96 formed in the interior of the passageway between the optical port 26 and ferrule 70 as is best shown in FIG. 6. The restricted openings 93, 94 and 96 not only prevent dust and/or moisture from interfering with the interface between the end 15 of optic fiber 18 and the lens 12, but, also make it easier to insert the optic fiber 18 through the passageway.

Figure 7:
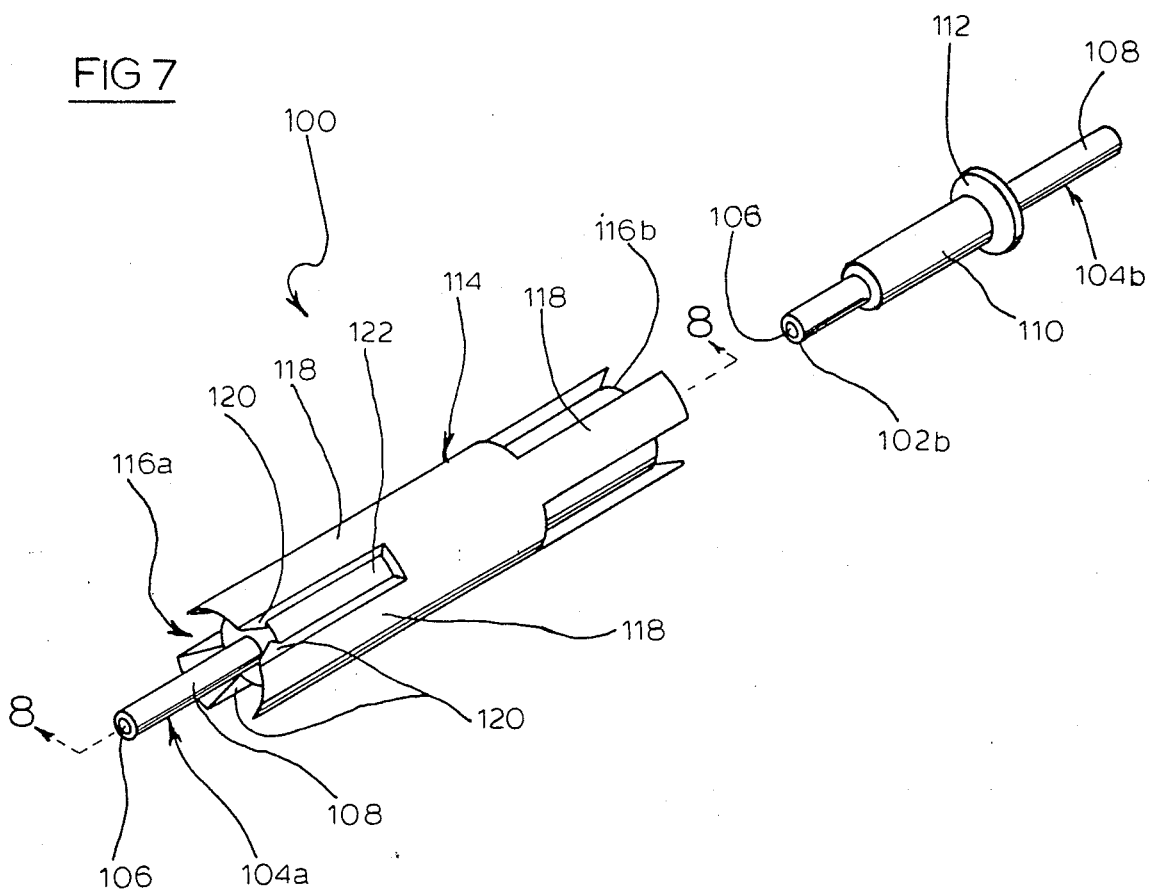
FIG. 7 is a partially exploded perspective view of one embodiment of a connector assembly of the present invention which mates the ends of a pair of optic fibers.
Figure 8:
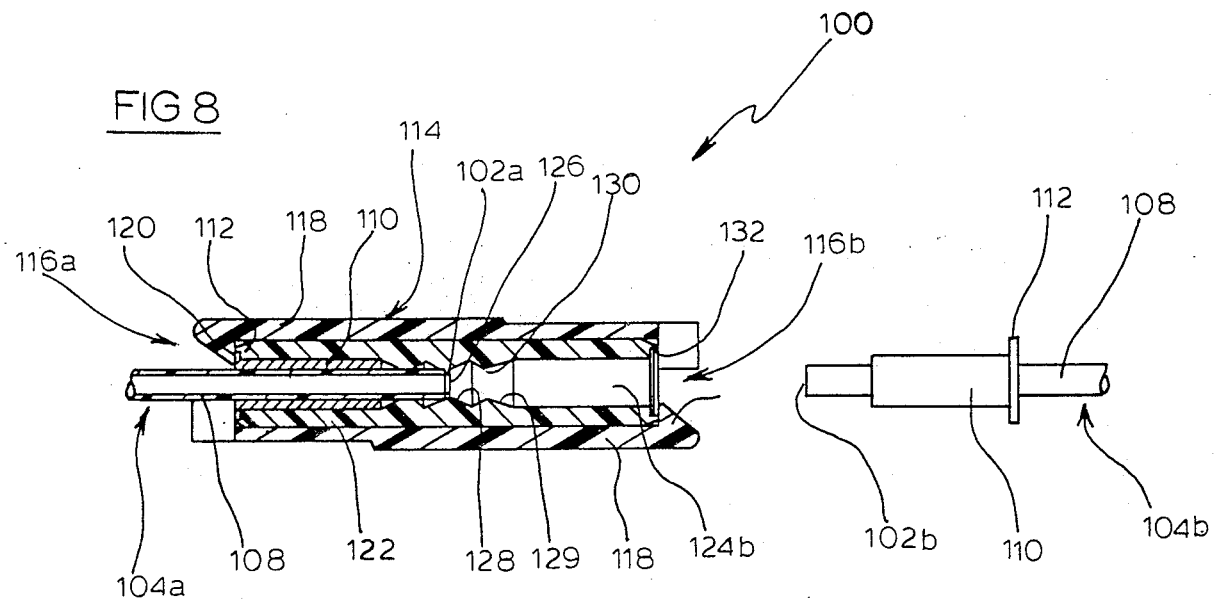
FIG. 8 is a sectional view taken generally along the line of 8—8 of FIG. 7.

Turning now to FIGS. 7 and 8, a connector assembly, generally designated 100, is used for the purpose of mating the ends 102a and 102b of two optic fibers, generally designated 104a and 104b, together. The optic fibers 104a and 104b have a typical fiber core 106 made of suitable light transmissive material such as glass or clear plastic. The core 106 is surrounded by a cable jacket 108.

A ferrule 110 is crimped about each optic fiber 104a and 104 The ferrule 110 has an annular flange 112 at one end tnereof. When the ferrule 110 is crimped about an optic fiber, the flange 112 is a given distance from the end 102a and 102b of its respective fiber 104a and 104b.

A housing body, generally designated 114, having two opposing open ends, 116a and 116b, is made of plastic material. The housing body 114 has three flexible cantilevered fingers 118 extending from either end thereof. The free ends of the fingers define the open ends 116a and 116b through which each of the optic fibers 104a and 104b are received. Engageable shoulders 120 are formed at the free end of each flexible finger 118 for purposes which will become more apparent hereinafter.

A generally open ended cylindrical resilient insert 122 is adapted to be received within the body 114 and captured between the shoulders 120 of the fingers 118. The insert 122 has an outside diameter substantially the same as the inside diameter of the housing body 114.

The insert 122 is divided generally into two cavities or passageways 124a and 124b which are connected by a restricted mating port 126. Passageway 124a receives optic fiber 104a through open end 116a while passageway 124b receives optic fiber 104b through open end 116b. The ends 102a and 102b of optic fibers 104a and 104b are adapted to meet and mate at the mating port 126.

In order to facilitate the guiding and alignment of ends 102a and 102b, the insert 122 has a profiled guide portion 128 which leads to the mating port 126. In addition, a second profiled guide portion 129 is provided which leads to a second restricted opening 130 which is located between the mating port 126 and the respective open ends 116a and 116b. The second restricted opening 130 is employed for sealing the interface between the two fiber ends 102a and 102b at the mating port 126.

The insert 122 has a countersunk ring portion 132 formed at each end adjacent the open ends 116a and 116b of the housing body 114. The space formed between the countersink 132 and shoulders 120 are provided to receive the flange 112 of the ferrule 110 when received in the respective passageway 124a and 124b. In this manner, the optic fibers 104a and 104b and correctly positioned within the housing body 114 and insert 122 so that the ends 102a and 102b will be aligned and meet at the mating port 126.

Figure 9:
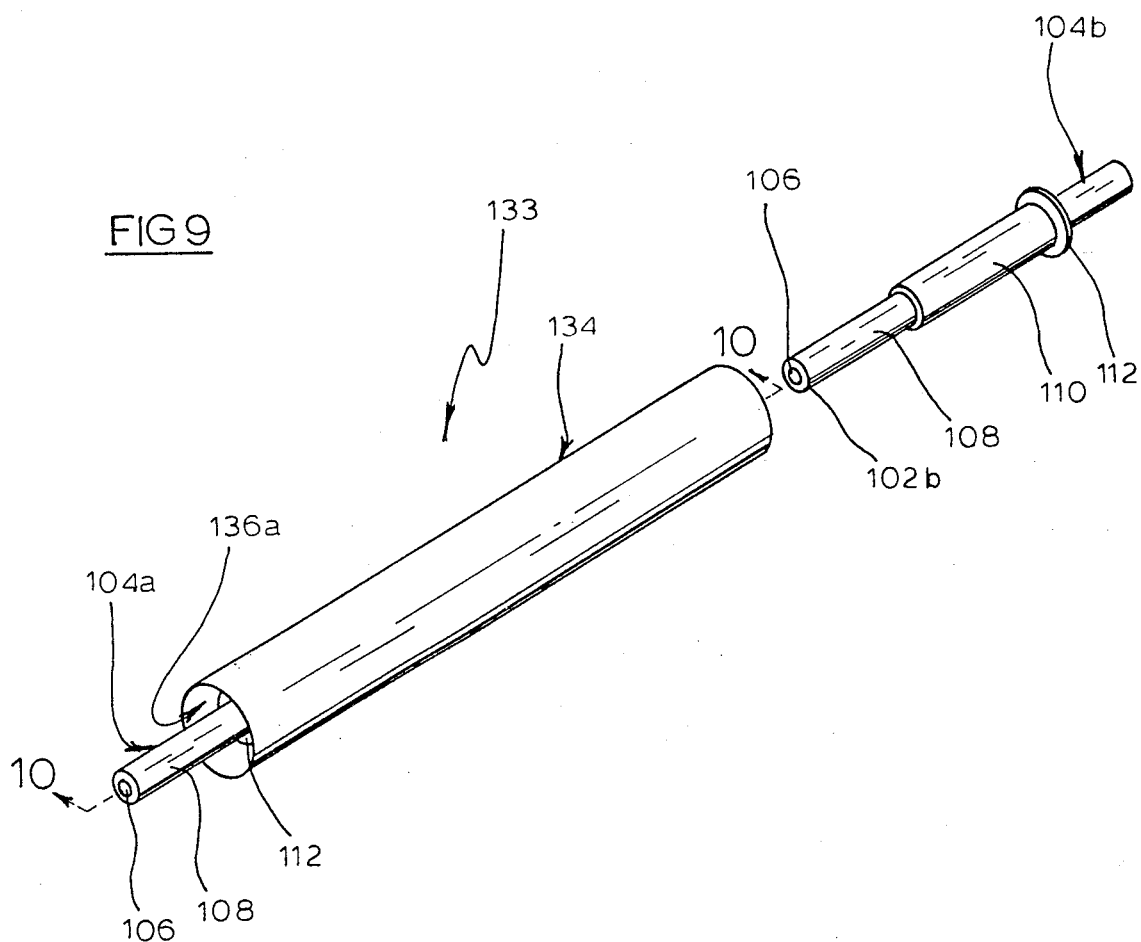
FIG. 9 is a partially exploded perspective view of another embodiment of a connector assembly of the present invention which mates the ends of a pair of optic fibers.
Figure 10:
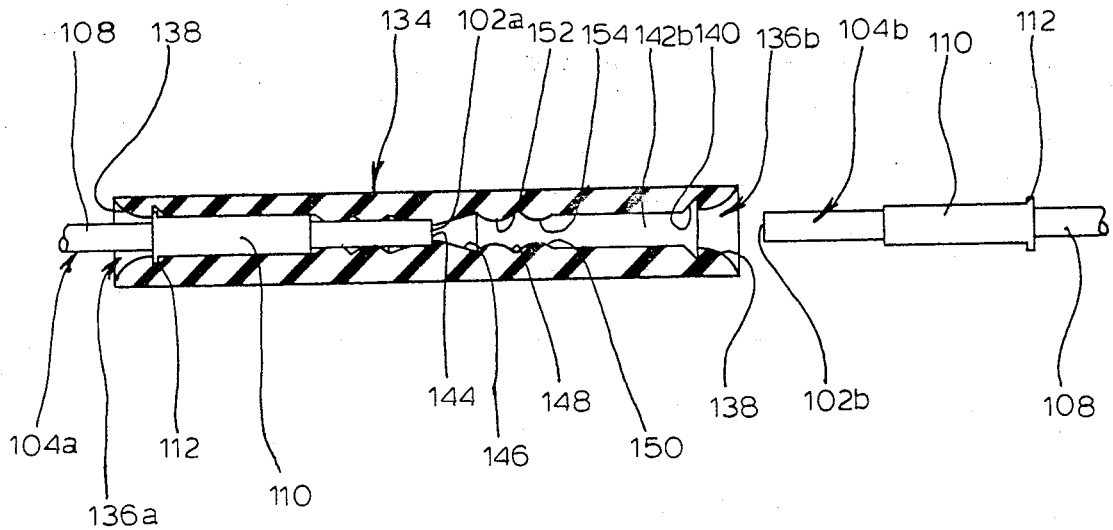
FIG. 10 is a sectional view taken generally along the line 10—10 of FIG. 9.

Turning now to FIGS. 9 and 10, a similar connector assembly, generally designated 133, is provided for the purpose of joining the ends 102a and 102b of a pair of optic fibers 104a and 104b. The fibers 104a and 104b have the same core 106 and jacket as described above. In addition, each of the fibers 104a and 104b has a ferrule 110 with an annular flange 112 crimped therearound in the manner already described.

The connector assembly 133 includes a unitary housing body 134 made of resilient elastomeric material. The housing body 134 is generally cylindrical and has two opposing open ends 136a and 136b through which fibers 104a and 104b are received therein. Each open end 136a and 136b has an inwardly flared guide surface 138 to facilitate the insertion of the fibers 104a and 104b and its crimped ferrule 120 therethrough. Immediately inwardly of the flared surface 138 a generally annular slot 140 is formed for receiving the flange 112 therein in a snap fit.

The unitary housing body 134 is divided into two passageways 142a and 142b which are joined at a mating port 144. The optic fibers 104a and 104b are received in the corresponding passageways 142a and 142b, respectively.

A profiled guide surface 146 is provided leading to the mating port 144 to align and guide the ends 102a and 102b of the fibers 104a and 104b together. Other profiled surfaces 148 and 150 are formed in each passageway 142a and 142b which lead to other restricted openings 152 and 154, respectively. The restricted openings 152 and 154 are generally the same diameter as the outer diameter of the optic fibers 104a and 104b and are provided for the purposes of sealing the interface between the fiber ends 102a and 102b as well as facilitating the insertion of the fibers 104a and 104b into their respective passageways 142a and 142b.

We claim:

1. A connector assembly for mating the end of an optic fiber with a second optic element, said assembly including
    a cylindrical ferrule adapted to be secured around the fiber, said ferrule having a flange located a predetermined distance from the end of the fiber,
    a housing for receiving and maintaining the fiber end and second optic element in mating relation, said housing having a first housing portion for receiving the second optic element, a second housing portion defining an elongated passageway for receiving the fiber and ferrule, said passageway including an open end through which the fiber and ferrule are received, and locking means at the open end of the passageway cooperating with the ferrule to maintain the fiber within the passageway, and
    port means located generally between the fiber end and the second optic element allowing optical communication therebetween to define an optical interface region, said port means including inverted funnel means facing the fiber end for guiding the fiber end into alignment with the second optic element,
the improvement comprising:
    a surface extending radially outwardly from the ferrule facing the port means; and
    an open ended cylindrically shaped elastomeric member secured around the fiber having an outside diameter greater than the diameter of the port means and not greater than the diameter of the passageway, said elastomeric member being held in compression between the radially extending surface and the inverted funnel means when the fiber and ferrule are inserted and locked into the first housing portion;
    whereby the pressure of the elastomeric member against the inverted funnel means serves to maintain the integrity of the optical interface by simultaneously maintaining the proper distance of the fiber end from the port means and sealing the optical interface at the port means from the outside environment.

2. The assembly of claim 1 wherein the ferrule includes a second flange spaced from the first flange having said radially extending surface.

3. The assembly of claim 1 wherein the locking means includes a plurality of cantilevered resilient fingers having free ends with shoulders formed thereon for engaging the ferrule flange.

4. The assembly of claim 1 wherein the housing is made of generally resilient elastomeric material, said locking means including an annular shoulder formed at the open end for engaging the ferrule flange.

5. The assembly of claim 1 wherein said inverted funnel means includes an inverted funnel having a first conical portion joining an open-ended tube portion and a second conical portion extending outwardly from said first conical portion at a greater angle than the first conical portion.

6. The assembly of claim 5 wherein the optic fiber includes a light transmissive fiber core surrounded by a fiber jacket, whereby said fiber core is received in said tube portion, said jacket is pressed against the first conical portion and said elastomeric member is pressed against said second conical portion.

7. A connector assembly for mating the end of an optic fiber with the lens of an optoelectronic device, said assembly including
    a cylindrical ferrule adapted to be secured around the fiber, said ferrule having a flange located a predetermined distance from the end of the fiber,
    a housing for receiving and maintaining the fiber end and lens of an optoelectronic device in mating relation, said housing having a first housing portion for receiving the optoelectronic device, a second housing portion defining an elongated passageway for receiving the fiber and ferrule, said passageway including an open end through which the fiber and ferrule are received, and locking means at the open end of the passageway cooperating with the ferrule to maintain the fiber within the passageway, and port means located generally between the fiber end and the lens of an optoelectronic device allowing optical communication therebetween to define an optical interface region, said port means including inverted funnel means facing the fiber end for guiding the fiber end into alignment with the lens of an optoelectronic device, the improvement comprising:

said inverted funnel means is integrally formed on the optoelectronic device.

8. The assembly of claim 7 wherein said inverted funnel means includes an inverted funnel having a first conical portion joining an open-ended tube portion and a second conical portion extending outwardly from said first conical portion at a greater angle than the first conical portion.

9. The assembly of claim 8 wherein the optic fiber includes a light transmissive fiber core surrounded by a fiber jacket, whereby said fiber core is received in said tube portion, said jacket is pressed against the first conical portion and said elastomeric member is pressed against said second conical portion.

10. The assembly of claim 7 including a surface extending radially outwardly from the ferrule facing the port means; and an open ended cylindrically shaped elastomeric member secured around the fiber having an outside diameter greater than the diameter of the port means and not greater than the diameter of the passageway, said elastomeric member being held in compression between the radially extending surface and the inverted funnel means when the fiber and ferrule are inserted and locked into the second housing portion;

whereby the pressure of the elastomeric member against the inverted funnel means serves to maintain the integrity of the optical interface by simultaneously maintaining the proper distance of the fiber end from the port means and sealing the optical interface at the port means from the outside environment.

* * * * *